April 25, 1950     A. N. ASSELIN     2,505,376
VACUUM RELIEF VALVE
Filed Feb. 7, 1946

ARTHUR N. ASSELIN ~ INVENTOR.

BY *Victor J. Evans & Co.*

ATTORNEYS

Patented Apr. 25, 1950

2,505,376

UNITED STATES PATENT OFFICE 2,505,376

VACUUM RELIEF VALVE

Arthur Napoleon Asselin, Fall River, Mass.

Application February 7, 1946, Serial No. 646,017

1 Claim. (Cl. 137—53)

This invention relates to a vacuum relief valve or vacuum breaker plug which are especially adapted to relieve the vacuum in a water container when the supply thereto is cut off and the water is being drained therefrom.

An important object of this invention is to provide a spring pressed valve that is so constructed that the water does not contact the spring, thus avoiding corroding of the spring and resultant damage thereto.

With the above and other objects and advantages in view the invention consists of the novel details of construction, arrangement and combination of parts more fully hereinafter described, claimed and illustrated in the accompanying drawing in which:

Figure 1:
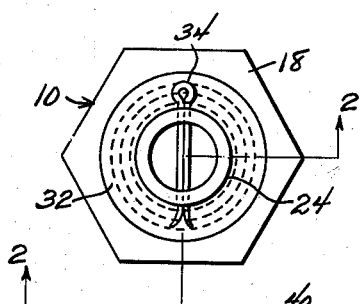
Figure 1 is a top plan view of an embodiment of the invention.
Figure 2:
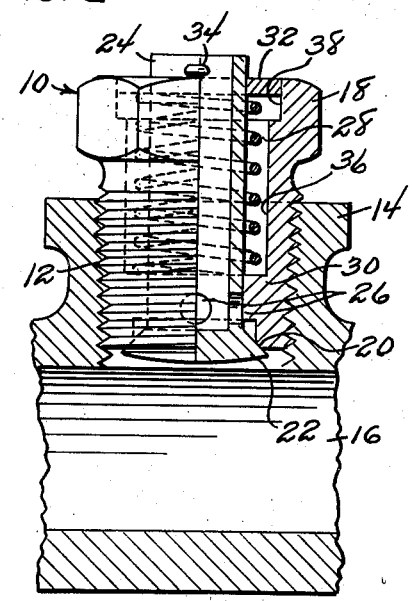
Figure 2 is a view partly in elevation and partly in section on the line 2—2 of Figure 1 with the device installed in a T shown in section and Figure 3 is a side elevation of a hot water tank equipped with a valve embodying the invention.
Figure 3:
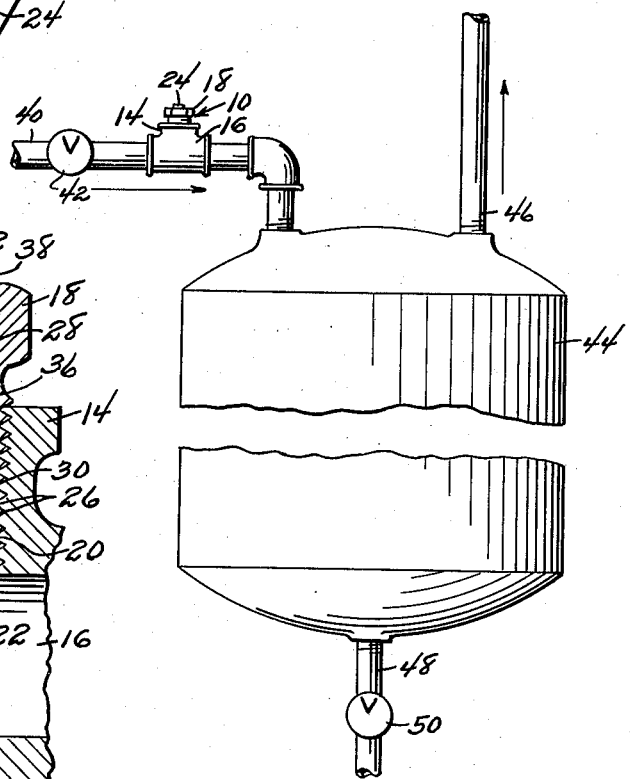

Referring more in detail to the drawing the reference numeral 10 designates the plug or housing providing a valve body having a threaded portion 12 at one end to engage with a pipe connection, such as one branch 14 of a T 16 while the other end of the body is provided with a wrench engaging head 18.

The body is provided with a seat 20 interiorally of the threaded portion 12 to engage the valve 22 which is provided with the upstanding tubular stem 24, having radially disposed openings or ports 26 adjacent the valve 22.

Thus air entering the stem 24 will enter the T 16 through the ports 26.

The valve is yieldingly pressed to its seat with a predetermined pressure by a coil spring 28 on the stem 24 having one end resting on a spring seat or shoulder of the portion or collar 30 through which the stem reciprocates and at the other end resting against a washer 32 retained in place by a cotter key 34 extending through the upper end of the stem. The spring is seated in a pocket 36 and the washer rests in a seat 38 of larger dimension than the pocket 36 but communicating therewith.

The valve is adapted to be installed in the supply pipe 40 intermediate the cutoff valve 42 and the tank 44 which is provided with the outlet pipe 46 and drain pipe 48 having the drain valve 50 interposed therein.

In operation if the pressure in the system drops naturally below atmospheric pressure, the valve will open freely against the action of the spring, to relieve the water container from the danger of crushing or crumbling because of the partial vacuum in the boiler.

It is believed that from the foregoing description when taken in conjunction with the illustration that the device will be apparent to those skilled in the art and it is to be understood that changes may be made in the details of construction, arrangement and combination of parts providing they fall within the spirit of the invention and the scope of the appended claim.

Having thus described the invention what is claimed as new and desired to be secured by Letters Patent is:

In a vacuum relieving valve for pressure tanks, the combination which comprises a plug providing a valve body having a threaded outer surface on the inner end with flat gripping surfaces on the outer end and having a longitudinally disposed bore extended therethrough, said body having an annular collar on the inner surface extended into the bore and spaced from the inner end with the outer edge of the collar forming a shoulder providing a spring seat, the outer end of said body having an annular recess therein concentric with the bore and also forming a shoulder providing a washer seat and stop, and the inner end of said body having an annular beveled surface around the bore providing a valve seat, a tubular valve stem having a head with a beveled inner surface providing a valve on the inner end with the beveled inner surface positioned to coact with the valve seat of the body and said tubular stem having radially disclosed openings through the wall thereof spaced from the said head, said tubular valve stem positioned in the bore of the valve body and longitudinally slidable through the said collar therein, a washer mounted on the upper outer end of the tubular stem and positioned to coact with the said washer seat of the body, and a spring positioned around the said tubular valve stem with one end positioned against the said spring seat and the other against the said washer whereby the spring urges the valve against the said valve seat of the body and as pressure is relieved on the inner end of the valve the spring is compressed whereby air passes through the opening through the valve stem and opening through the wall thereof into an area at the inner end of the valve.

ARTHUR NAPOLEON ASSELIN.

REFERENCES CITED

The following references are of record in the file of this patent:

UNITED STATES PATENTS

| Number | Name | Date |
|---|---|---|
| 313,140 | Weimer | Mar. 3, 1885 |
| 650,650 | Niehoff | May 29, 1900 |
| 1,462,519 | Rothe | July 24, 1923 |
| 2,090,512 | Ernst | Aug. 17, 1937 |